July 12, 1955

H. J. NEIDHART 2,712,742

ELASTIC JOINTS

Filed June 19, 1951

INVENTOR
Hermann J. Neidhart
BY Evans & McCoy
ATTORNEYS

July 12, 1955

H. J. NEIDHART 2,712,742

ELASTIC JOINTS

Filed June 19, 1951

INVENTOR
Hermann J. Neidhart
BY
Evans + McCoy
ATTORNEYS

United States Patent Office 2,712,742
Patented July 12, 1955

2,712,742

ELASTIC JOINTS

Hermann J. Neidhart, Geneva, Switzerland

Application June 19, 1951, Serial No. 232,306

8 Claims. (Cl. 64—14)

This invention relates to improvements in elastic joints employing elastic cushioning elements disposed between relatively rotatable members for yieldingly resisting such rotation. More particularly, the invention relates to such elastic joints wherein one of the relatively rotatable members surrounds the other concentrically with respect to a common axis of relative rotation, the elastic cushioning elements being disposed inside the outer member, and about the inner member.

This application is a continuation in part of my applications Serial Nos. 5,115, filed January 29, 1948, for Flexible Joint, and Serial No. 785,053, filed November 10, 1947, for Elastic Joint, both being based on prior foreign applications but now being abandoned.

A number of attempts have previously been made to devise joints of the general character described in which relative rotation of the inner member is resisted entirely by elastic elements, such as rubber, either by placing the elastic elements in shear, in compression, or both. However, in so far as I am aware, all of the prior attempts have met with indifferent and greatly restricted commercial acceptance, or have proved to be of no practical value at all.

One of the principal defects of most of the prior art devices of this general character is the small permissible range of relative movement of the inner and outer members between their unloaded and fully loaded conditions. Efforts to achieve a wider range of relative movement were generally obtainable only at the expense of the load resisting capacity or the durability of the joint, or both. Also, most of the prior art devices had undesirable load-deflection characteristics which could not be greatly altered to suit the requirements of particular commercial applications. In some instances, the shapes of the inner and outer members rendered their fabrication so expensive as to preclude any wide commercial acceptance.

One of the principal objects of the present invention is to provide a flexible joint of the character described that permits relative rotary movement of the connected members through a substantial angle while subjecting the elastic cushioning elements substantially only to compressive stresses.

Another important object of the invention is to provide a flexible joint of simplified design that is adaptable to a wide variety of different commercial uses with little or no variation in the component parts, that is economical to manufacture and assemble, that is consistent and predictable in its operating characteristics, and that is rugged and durable in use.

Still another object of the invention is to provide a flexible joint of the character described which can be produced with a wide range of load-deflection characteristics.

A still further object of the invention is to provide a flexible joint of the character described with provision for sustaining the load applied thereto if the cushioning elements should be accidentally damaged or destroyed by fire or other unusual conditions.

With these and other objects in view, I have provided a flexible joint in which the interior cross-section of the outer member and the exterior cross-section of the inner member substantially conform to similar, regular polygons, and the cushioning elements, preferably in the form of generally circular cylinders, are normally nested between and engaged by a pair of adjacent inner sides of the outer member and by one outer side of the inner member when no load is applied. Under these conditions, the outer sides of the inner member are directly opposite the apices or junctures of the inner sides of the outer member. When the device is loaded to cause relative rotation of the inner and outer members about their common axis of rotation, a rolling action is imparted to the cushioning elements as they are compressed between flat surfaces of the inner and outer members, which surfaces approach a parallel relationship at the point of theoretical maximum loading. Thus, each cushioning element rolls with no appreciable friction along both of the opposed flat surfaces between which it is compressed under load.

The clearance space between the inner and outer members relative to the diameter of the elastic cushioning rollers (which are preferably under some precompression) and the modulus of elasticity of the selected cushioning material may be varied in an otherwise fixed design to give different, predictable, load-deflection characteristics, as will hereinafter be more fully explained. Also, by varying the number of sides of the inner and outer polygon shapes between three and about eight (as a practical maximum for most conditions of use), the maximum amplitude of relative rotation of the inner and outer members may be varied, the maximum amplitude being inversely proportional to the number of sides of the polygon shapes.

For a more complete understanding of the invention in its various forms and how it may advantageously be employed in practice, several embodiments of the invention are shown in the accompanying drawings for illustrative purposes. Numerous modifications thereof for specific applications will occur to those skilled in the art, and such modifications are contemplated as falling within the scope of the invention as herein described and claimed.

Referring to the drawings.

Figure 1:
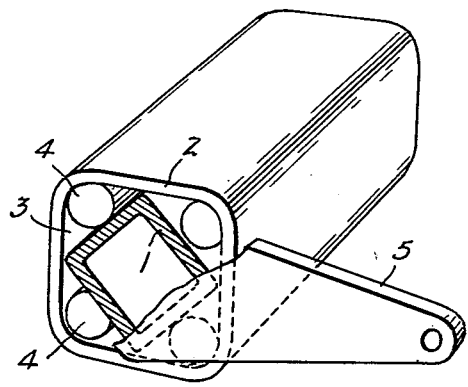
Fig. 1 is a perspective view of one embodiment of the invention employing inner and outer members that are square in transverse section, the parts being shown somewhat diagrammatically in their unloaded condition.
Figure 2:
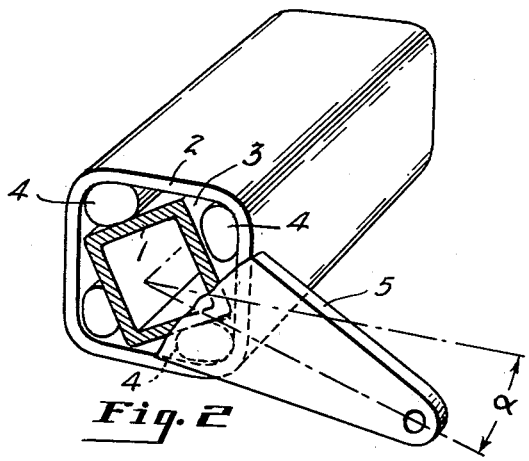
Fig. 2 is a view similar to Fig. 1, but shows the parts after relative rotation of the inner and outer members under load.

The form of the invention illustrated in Figs. 1 and 2 may comprise inner and outer tubular members 1 and 2, both being substantially square in cross-section but having the longitudinal junctures of their sides more or less rounded, as shown, to eliminate sharp external edges or corners from the inner member and sharp internal angles from the outer member. In the no-load condition shown in Fig. 1, each side face of the inner member is opposite the apex or juncture between two sides of the outer member so as to define a longitudinally extending pocket 3 for a cushioning element 4. The inner and outer members are preferably concentric so that each pocket 3 has the general form of an isosceles right triangle in transverse section when no torque load is applied to the device.

The cushioning elements 4 are preferably in the form of round rods and may be made of vulcanized natural or synthetic rubber, or any other elastic material having similar properties. By reason of the deformability of the cushioning elements, it is not essential that they be round in transverse section. Cushioning elements that are oval, roughly triangular, or otherwise out of round in transverse section when unstressed may be employed. Such shapes will retain substantially the same rolling relationship with the inner and outer members when distorted and displaced under load. However, since the cushioning elements may gradually slip or creep around their own axes, it is obvious that a consistent and smooth load-deflection curve will not generally be obtained unless the cushioning elements are substantially circular in transverse section. Also, any very substantial departure from circular transverse sections for the cushioning elements may, as these elements slip about their own axis over a period of time, prevent complete return of the elements to their original, no-load positions.

Figure 5:
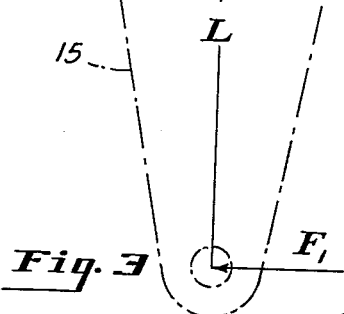
Fig. 5 is a plan view, partly in section, of a device like that of Fig. 3 as it may be adapted for use in a vehicle suspension system or other mechanism in which elastic resistance to the turning of a shaft is desired.
Figure 5:
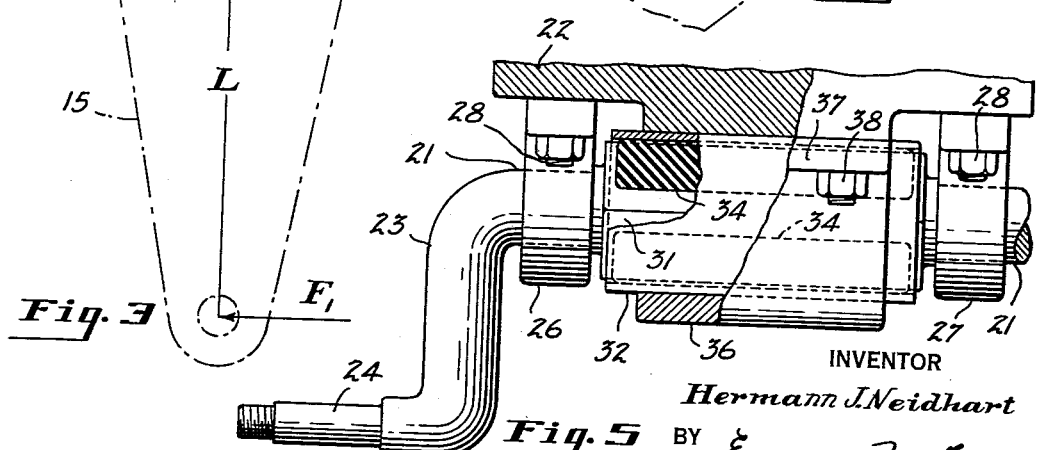

As diagrammatically indicated in the drawing, a crank or lever arm 5 may be rigidly connected to one end of the inner member 1 for applying torque thereto. Obviously, similar load applying cranks may be applied to both ends of the inner member to obtain more uniform loading. Also, where torque is applied through a crank arm, suitable bearings will generally be desired to maintain the original concentricity of the inner and outer members, as shown in Fig. 5 for example. For simplicity and clarity, however, such details are omitted from Figs. 1 and 2, and a portion of the crank arm 5 is shown broken away.

With the outer member 2 rigidly held against rotation, deflection of the crank arm 5 in a clockwise direction through an angle $\alpha$ will cause the inner member 1 to rotate through the same angle to the loaded condition illustrated in Fig. 2. Such relative rotation of the inner member with respect to the outer member is resisted by the cushioning elements 4, each of which tends to rotate counter-clockwise and roll along the original engaging side of the inner member and one of the original engaging sides of the outer member.

The cushioning elements are thus subjected substantially only to compression between two flat surfaces, which surfaces approach a parallel, dead center relationship with $\alpha$ equal to 45° (where the inner and outer members 1 and 2 are square in transverse section). In actual practice, with square sections, $\alpha$ should generally not be permitted to exceed about 42° or there will be danger of going beyond the dead center position, in which case the parts will not return to their original positions upon removal of the torque, but will move around in 90° jumps.

So long as the maximum compression at the dead center position is not reached, the parts will move back to their original positions upon gradual removal of the applied torque. Rapid removal of the torque and the resulting high inertia of the connected moving parts may cause a reverse rebound somewhat beyond the original no-load position of the parts. This reverse movement beyond the no-load position is similarly resisted by compression of the cushioning elements, thus effectively cushioning the rebound. Obviously, the device is completely reversible in the sense that it will provide the same resistance to torque applied in either direction about the axis of relative rotation of the inner and outer members.

As will be apparent from an examination of the device of Figs. 1 and 2, the torque resistance by the cushioning elements will depend upon several relationships that may be varied at the pleasure of the designer to meet specific load and deflection requirements. Thus, if the sides of the inner member are reduced slightly in width relative to the width of the sides of the outer member and corresponding larger cushioning elements are employed to fill the larger pockets, the dead center condition of the device will be reached with less actual compression of the larger cushioning elements. Compression of the cushioning elements in terms of per cent of diameter (proportional to load) will be reduced to a still greater degree. Also, the resistance of the cushioning elements will vary according to the modulus of elasticity of the material of which they are made. Obviously, the stiffer the cushioning material, the greater will be the resistance of the cushioning elements for any given value of the angle $\alpha$.

Still another way in which to increase the stiffness of the joint is to increase the diameter of the cushioning elements so that they are under an initial compression in the no-load condition to the device. As is well known, natural and synthetic rubbers, when placed in compression, have load-deflection relationship that depart substantially from straight line functions. Thus, the additional load required to produce a deflection of 1 angular unit increases with each increment of compression of the cushioning elements, and subjecting the cushioning elements to initial compression in the no-load condition of the device increases their resistance to any applied torque.

Figure 3:
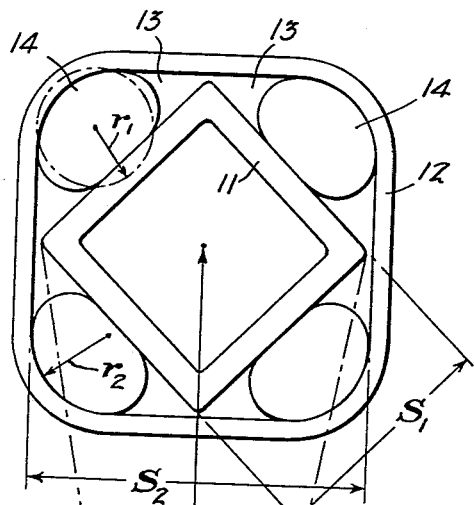
Fig. 3 is a somewhat diagrammatic end view of a modified form of the invention that is generally similar to the device of Fig. 1, but employs cushioning elements that are subjected to an initial radial compression during assembly, the parts being shown in their unloaded condition.
Figure 4:
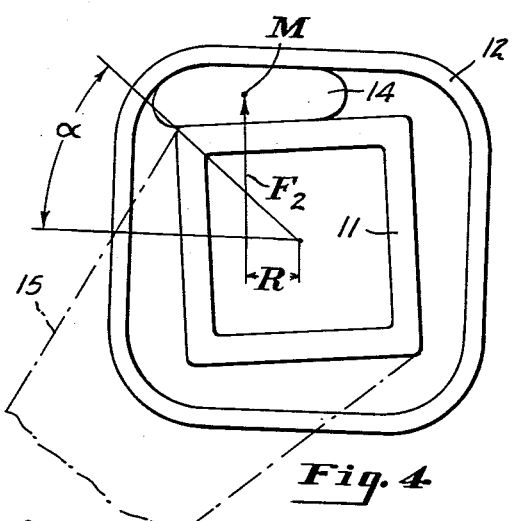
Fig. 4 is a view similar to Fig. 3, but shows the device after relative rotation of the inner and outer members under load, all but one of the cushioning elements being omitted for simplicity.

Referring now to the form of the invention shown in Figs. 3 and 4, the inner and outer tubular members 11 and 12 are substantially the same as those in Figs. 1 and 2. They also define four similar pockets 13 that receive four similar cushioning elements 14. It will be noted, however, that the cushioning elements 14 depart substantially from circular cylinders in the no-load condition of the assembly shown in Fig. 3. These cushioning elements are preferably circular in transverse section when unstressed, as indicated for one of these elements in Fig. 3 by a dot-dash outline, and they are radially compressed between the inner and outer members in the course of assembling the device. They may be inserted into the pockets 13 while being stretched longitudinally to effect a temporary reduction in their diameters, or they may be forced into position through suitable funnel shaped guides (not shown).

By reason of this precompression of the cushioning elements 14, they are flattened to a greater degree than the cushioning elements 4 of Figs. 1 and 2, when the device is subjected to a given load, as indicated by a comparison of Fig. 4 with Fig. 2. In other respects, the device of Fig. 3 and 4 is substantially the same as the device of Figs. 1 and 2 in both structural and functional respects.

The torque resisting capacity of a device constructed in accordance with the invention may be calculated with reasonable accuracy (with the assistance of certain empirical data) for the maximum permissible loading, or for any intermediate loading condition. For illustrative purposes, a torque arm 15 is shown in dot-dash lines connected to the inner tubular member 11 for rotating it with respect to the outer tubular member 12, the latter being treated as fixed against rotation. The effective length of the arm 15 is designated L. A loading force applied thereto is designated $F_1$. The torque T applied to the inner tubular member 11, therefore, is $F_1L$. This torque is elastically resisted substantially entirely by the compression of the four cushioning elements 14, each of which resists one-fourth of the applied torque while permitting rotation of the inner member through an angle $\alpha$.

The resultant force $F_2$ acting between the inner member 11 and any one of the cushioning elements 14 may, for practical purposes, be considered as acting along a line passing through the axis of the cushioning elements 14 in a direction normal to the adjacent outer surface of the inner member 11. The axis of the cushioning elements after the inner and outer members have been rotated through the maximum safe angle of about 42° passes through the center of mass M of the distorted body and may be determined experimentally.

It will be substantially the same for all sizes of devices in which the various parts are similarly proportioned. By locating this axis and drawing an arrow representing the force $F_2$, the radius R of the lever arm through which this force acts on the inner member 11 is graphically obtained.

The magnitude of the force $F_2$ is dependent upon the effective reduction in diameter of the cushioning element from its completely unstressed condition to its fully stressed condition, by the length c of the cushioning elements, and by the modulus of elasticity of the cushioning elements for the degree of compression employed. The effective stressed diameter may be measured along the line of the resultant force $F_2$. The modulus of elasticity of the cushioning element depends, of course, on the material of which it is made and is determined experimentally in terms of compressive force per unit length of the cushioning element for the degree of compression employed. Representing this modulus of elasticity as $\lambda$, the following relationships exist:

$$T = F_1 L = 4 F_2 R = 4 \lambda c R$$

or $$F_1 = \frac{4 \lambda c R}{L}$$

As is apparent from these simple formulae, the approximate load carrying capacity of a particular device may be quickly calculated from data that is easily compiled. This makes possible the rapid preparation of reliable specification to meet any particular service conditions.

To illustrate one manner in which the invention may be employed in practice, Fig. 5 shows the invention as applied to a simple vehicle suspension system or the like in which a torsion shaft 21 extends transversely of a vehicle body 22 and has a crank arm 23 at each end thereof (only one being shown) carrying a wheel spindle 24. The torsion shaft may be rotatably mounted on the body 22 at each side thereof by means of a pair of suitable bearings 26 and 27 secured to the body 22 in any desired manner, as by bolts and nuts 28. The torsion shaft 21 is provided with an enlarged portion 31 of square cross-section extending between each pair of bearings 26 and 27 and forming the inner member of a flexible joint embodying the present invention. An outer tubular member 32, also square in cross-section, surrounds the inner member 31 to provide four generally triangular pockets containing a corresponding number of cushioning elements 34. This arrangement of inner and outer members and cushioning elements conforms in transverse section to Fig. 3 of the drawing when the device is in its no-load condition.

The inner member 31, being integral with the torsion shaft 21, rotates therewith. The outer member 32 is prevented from rotating and is rigidly mounted on the body 22 by means of a generally U-shaped bracket 36 having oppositely directed flanges 37 secured to the body 22 by a plurality of sets of studs and nuts 38 (only one set being shown).

The load of the vehicle body is transmitted to vehicle wheels mounted on the spindles 24 through the crank arms 23, thus applying a torque to the torsion shaft which rotates the inner member 31 with respect to the outer member 32 through an angle varying with the weight of the vehicle body and its load. The flexible joint should be designed to be deflected through only a small portion of the maximum permissible angle of 42° when carrying the vehicle body only, in order to accommodate additional loads carried by the body and to yield with road shocks, in accordance with well known principles.

Figure 6:
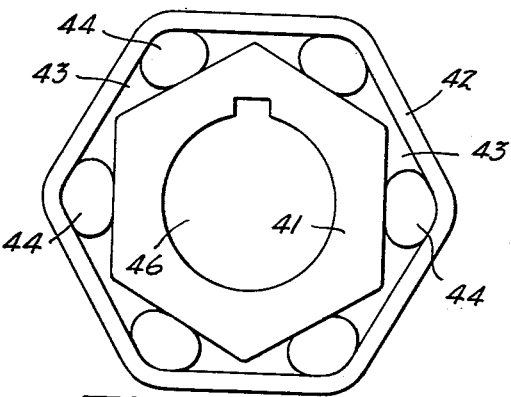
Fig. 6 is an end view of another modification of the invention in which the inner and outer members are hexagonal in transverse section.

Fig. 6 shows, in transverse section, an embodiment of the invention in which the inner and outer members 41 and 42 have six sides each. Each side of the inner member is normally disposed opposite one of the apices of the outer member to define a pocket 43 therebetween for receiving a cylindrical cushioning element 44, preferably inserted under initial radial compression. The inner member may be keyed to a shaft 46 or integrally formed therewith as desired.

In the embodiment of the invention shown in Fig. 6, the torque load applied to the device is elastically resisted by six cushioning elements 44, and the maximum safe angle of relative rotation of the inner member 41 with respect to the outer member 42 must be limited to something slightly less than 30°. In other respects, the operation of this embodiment of the invention is substantially the same as the operation of the embodiment shown in Figs. 1 to 5.

Figure 7:
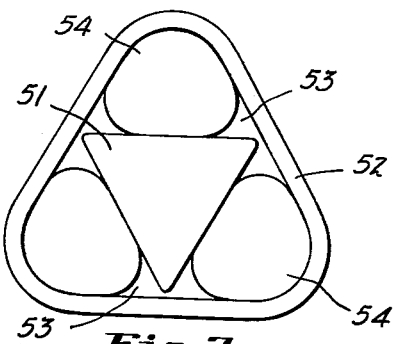
Fig. 7 is an end view of another modification of the invention in which the inner and outer members are triangular in transverse section.

Fig. 7 shows still another embodiment of the invention in which the inner and outer members 51 and 52 have but three sides each, the sides of the inner member normally being disposed opposite the apices of the outer member to define generally triangular pockets 53 therebetween for receiving cushioning elements 54, preferably inserted under initial radial compression. In this case the maximum safe angle of relative rotation of the inner and outer members is only slightly less than 60°, and each of the three cushioning elements elastically resists one-third of the total torque applied to the device.

Figure 8:
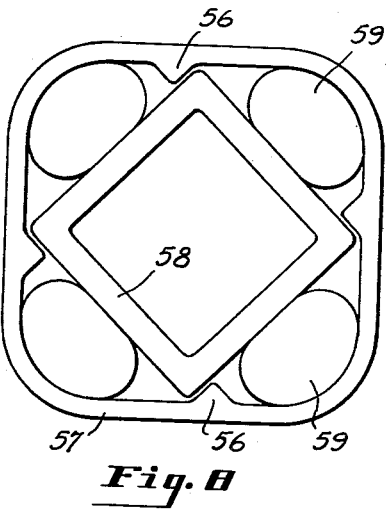
Fig. 8 is an end view of another modification of the invention in which provision is made for preventing relative rotation of the inner and outer members in one direction from a no-load condition, and for limiting the relative rotation of these members in the opposite direction in the event of overloading or serious damage to or destruction of the cushioning elements.

Fig. 8 shows still another embodiment of the invention that is generally similar to that shown in Figs. 3 and 4, except that triangular ribs 56 that preferably extend longitudinally of the device are provided on the inner sides of the outer member 57 for limiting relative rotation of the inner member 58 relative to the outer tubular member 57. In this device any torque tending to rotate the inner member in a counter-clockwise direction with respect to the outer member, as viewed in the drawing, is positively resisted by the ribs 56 against which the inner member abuts. Relative rotation of the inner member in a clockwise direction with respect to the outer member, however, is yieldingly resisted by cushioning elements 59 in the same manner as with the device in Figs. 1 to 5.

The form of the invention shown in Fig. 8 is particularly suited where relative rotation of the inner and outer members is desired in one direction only from their no-load positions. The ribs 56 in this embodiment of the invention constitute a safety feature in the event of damage to or accidental destruction of the cushioning elements 59, as by fire, in addition to preventing rebound in a counter-clockwise direction beyond the no-load position. In the event of damage to or destruction of the cushioning elements, the inner member 58 will be permitted to rotate clockwise through an angle slightly less than 90° from the no-load position before the ribs 56 engage the inner member 58 and stop such clockwise rotation.

Figure 9:
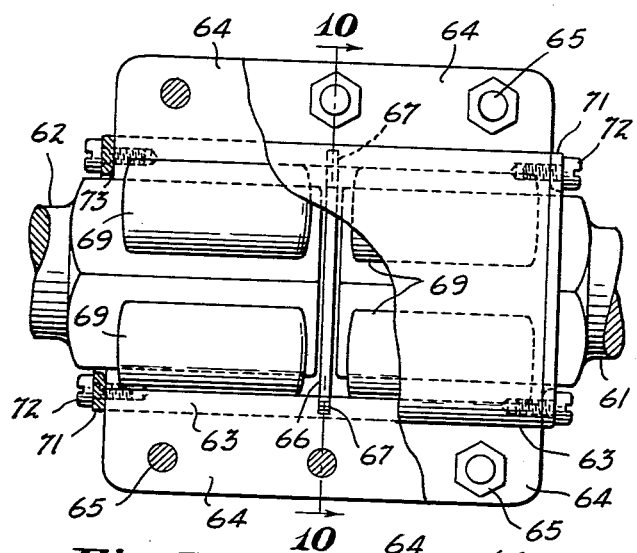
Fig. 9 is a plan view of still another modification of the invention, showing its application as a shaft coupling.
Figure 10:
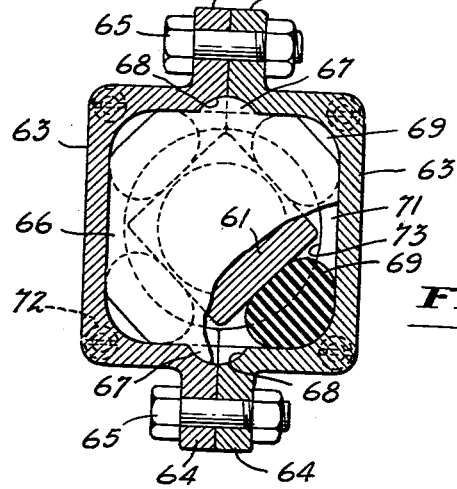
Fig. 10 is a transverse sectional view of the device of Fig. 9, the plane of the section being indicated by the line 10—10 in Fig. 9.

Figs. 9 and 10 show still another modification of the invention as applied to the coupling of two coaxial shafts 61 and 62. In its general character, the flexible joint itself, as shown in these figures of the drawing, is similar to the flexible joint of Figs. 3 and 4 with minor structural variations particularly suited for use when the invention is employed as a shaft coupling.

In this instance, the outer member is made up of two identical U-shaped sections 63 having pairs of oppositely directed flanges 64 that may be secured together by sets of bolts and nuts 65 to form the outer tubular member of the device. The adjacent end portions of the shafts 61 and 62 are square in transverse section and are disposed with a space therebetween to accommodate a retaining plate 66. A pair of opposite edges of the plate 66 are provided with projecting tabs or lugs 67 that are received in notches 68 that may be milled or otherwise formed in each of the U-shaped sections 63. The plate 66 is thus fixed with respect to the outer tubular member and restrains it from moving axially in either direction with respect to the shafts 61 or 62.

The square end portion of each of the shafts 61 and 62 constitutes a separate inner member having its sides normally disposed opposite the apices of the outer member (no-load condition), and a separate set of four cushioning elements 69 is disposed between the square end of each shaft and the surrounding portion of the outer tubular member. Each set of cushioning elements 69 is spaced from the other set by the retaining plate 66 to prevent engagement of the ends of one set of cushioning elements with the ends of the other set of cushioning elements, which would have seriously destructive effects thereon.

As is apparent, each of the coaxial shafts 61 and 62 is independently mounted in the outer tubular member for rotation with respect thereto through a maximum safe angle of about 42°; the relative rotation being elastically resisted by compression of the associated set of cushioning elements 69. Thus, the two shafts 61 and 62 may safely be rotated relative to each other against the resistance of the cushioning elements through a total angle of about 84°.

It may be desirable to provide means for restraining outward endwise movement of the cushioning elements 69 with respect to the outer tubular member in a coupling of this character. This may be accomplished by a pair of generally square retaining plates 71 secured by screws 72 to the ends of the outer tubular member. The retaining plates 71 may be provided with centrally disposed circular openings 73 of sufficient size to receive the square ends of the shafts 61 and 62 with slight clearance. As best shown in Fig. 10, the plates 71 project inwardly sufficiently far to effectively retain the cushioning elements 69 within the outer tubular member.

The two-piece outer tubular member made up of the generally U-shaped sections 63 facilitates assembly of the device when the shafts to be coupled are fixed against substantial endwise movement. Thus, the retaining plate 66 may be slipped between the ends of the shafts and held in one of the U-shaped sections 63 while the second U-shaped section 63 is applied. The cushioning elements 69 may then be inserted while the bolts and nuts 65 are still loose. Upon tightening the bolts and nuts 65 to bring the two sections 63 of the outer tubular member firmly together, the cushioning elements 69 are placed under initial radial compression without the necessity for adopting either of the above-mentioned special techniques for inserting them.

In each of the embodiments of the invention shown herein and described above, the inner sides of the outer tubular member are curved at the apices therebetween to avoid sharp internal angles. I have found, for most satisfactory results, that the radius of these curves (designated $r_2$ in Fig. 3) should generally be about equal to the radius of the cushioning elements if the cushioning elements are not placed under initial radial compression. If the cushioning elements are placed under initial radial compression, as shown in Figs. 3 to 10 inclusive, the radius $r_2$ should be slightly greater than the radius $r_1$ of the cushioning elements. The larger the radius $r_2$ the closer the contour of the outer tubular member approaches that of a circular cylinder which condition would render the device inoperative. Therefore, the radius $r_2$ should generally be not materially greater than $1\frac{1}{3} r_1$. For a device employing square inner and outer tubular members, the ratio of the radius $r_1$ of the cushioning elements to the width $S_1$ of the inner member and to the width $S_2$ of the inner sides of the outer member should generally be between the limits of 1:4:6 for a softly cushioned joint and 1:3.6:5.4 for a stiffly cushioned joint.

As is well known, there are practical limits upon the degree to which various materials may be deformed in compression without taking a permanent set. When using rubber cushioning elements, I have found that this limiting condition is safely avoided and satisfactory life of the cushioning members is obtained by limiting the maximum reduction in diameter of the cushioning elements to 47.5%.

By appropriately selecting the cushioning materials employed and the shapes and proportions of the parts in accordance with the general principles explained above, flexible joints may be produced having any selected degree of stiffness and varying torque-deflection characteristics over a wide range, while employing only easily fabricated and assembled structural parts to form the devices. The devices are consistent and predictable in their operating characteristics and rugged and durable in use, and their simplicity makes them particularly suitable for many mechanical applications for which satisfactory elastic joints have long been sought.

Having described my invention, I claim:

1. In an elastic joint comprising an outer tubular member, an inner member coaxially mounted within the outer member for rotation relative thereto about their common axis, and a plurality of cylinders of elastic cushioning material disposed between the interior of the outer member and the exterior of the inner member, said cylinders being generally circular in transverse section when unstressed and being disposed with their axes parallel to the common axis of the inner and outer members, the improvement in which the interior of said outer member and the exterior of said inner member substantially correspond in transverse section to straight-sided squares, the straight sides of the inner member normally being disposed opposite the apices of the outer member and intersecting at corners spaced from the straight sides of the outer member with clearance, the straight inner sides of the outer member merging at their corner junctions along inwardly concave curves, and one of said cylinders being normally disposed against each of said curved junctions and confined between two adjacent straight inner sides of the outer member and one straight side of the inner member, whereby rotation of one of said members with respect to the other about said common axis through an angle up to 45° will impart rolling movement to said cylinders along confining sides of both of said members while increasingly compressing said cylinders radially therebetween throughout rotation of said members through said angle.

2. In an elastic joint comprising an outer tubular member, an inner member coaxially mounted within the outer member for rotation relative thereto about their common axis, and four cylinders of elastic cushioning material disposed between the interior of the outer member and the exterior of the inner member, said cylinders being generally circular in transverse section when unstressed and being disposed with their axes parallel to the common axis of the inner and outer members, the improvement in which the interior of said outer member and the exterior of said inner member substantially correspond in transverse section to straight-sided squares, the straight sides of the inner member normally being disposed opposite the apices of the outer member and intersecting at corners spaced from the straight sides of the outer member with clearance, the straight inner sides of the outer member merging at their corner junctions along inwardly concave curves having a radius not exceeding 1⅓ times the radius of the cushioning elements when unstressed, and one of said cylinders being normally disposed under compression between each of said curved junction and the adjacent straight side of the inner member whereby rotation of one of said members with respect to the other about said common axis through an angle up to 45° will impart rolling movement to said cylinders along confining sides of both of said members while increasingly compressing said cylinders radially therebetween throughout rotation of said members through said angle.

3. In an elastic joint comprising an outer tubular member, an inner member coaxially mounted within the outer member for rotation relative thereto about their common axis, and a plurality of cylinders of elastic cushioning material disposed between the interior of the outer member and the exterior of the inner member, said cylinders being generally circular in transverse section when unstressed and being disposed with their axes parallel to the common axis of the inner and outer members, the improvement in which the interior of said outer member and the exterior of said inner member substantially correspond in transverse section to straight-sided squares, the straight sides of the inner member normally being disposed opposite the apices of the outer member and intersecting at corners spaced from the straight sides of the outer member with clearance, the straight inner sides of the outer member merging at their corner junctions along inwardly concave curves, and one of said cylinders being normally disposed against each of said curved junctions and confined between two adjacent straight inner sides of the outer member and one straight side of the inner member, whereby rotation of one of said members with respect to the other about said common axis through an angle up to 45° will impart rolling movement to said cylinders along confining sides of both of said members while increasingly compressing said cylinders radially therebetween throughout rotation of said members through said angle, the radius of said cylinders being at least ¼ the length of the straight sides of said inner member.

4. In an elastic joint comprising an outer tubular member, an inner member coaxially mounted within the outer member for rotation relative thereto about their common axis, and four cylinders of elastic cushioning material disposed between the interior of the outer member and the exterior of the inner member, said cylinders being generally circular in transverse section when unstressed and being disposed with their axes parallel to the common axis of the inner and outer members, the improvement in which the interior of said outer member and the exterior of said inner member substantially correspond in transverse section to straight-sided squares, the straight sides of the inner member normally being disposed opposite the apices of the outer member and intersecting at corners spaced from the straight sides of the outer member with clearance, the straight inner sides of the outer member merging at their corner junctions along inwardly concave curves having a radius not exceeding 1⅓ times the radius of the cushioning elements when unstressed, and one of said cylinders being normally disposed under compression between each of said curved junctions and the adjacent straight side of the inner member, whereby rotation of one of said members with respect to the other about said common axis through an angle up to 45° will impart rolling movement to said cylinders along confining sides of both of said members while increasingly compressing said cylinders radially therebetween throughout rotation of said members through said angle, the radius of said cylinders being at least ¼ the length of the straight sides of said inner members, and the length of the straight sides of the inner member being approximately ⅔ the spacing between opposite inner sides of the outer member.

5. In an elastic joint comprising an outer tubular member, an inner member coaxially mounted within the outer member for rotation relative thereto about their common axis, and a plurality of cylinders of elastic cushioning material disposed between the interior of the outer member and the exterior of the inner member, said cylinders being generally circular in transverse section when unstressed and being disposed with their axes parallel to the common axis of the inner and outer members, the improvement in which the interior of said outer member and the exterior of said inner member substantially correspond in transverse section to a straight-sided squares, the straight sides of the inner member normally being disposed opposite the apices of the outer member and intersecting at corners spaced from the straight sides of the outer member with clearance, the straight inner sides of the outer member merging at their corner junctions along inwardly concave curves, and one of said cylinders being normally disposed against each of said curved junctions and confined between two adjacent straight inner sides of the outer member and one straight side of the inner member, whereby rotation of one of said members with respect to the other about said common axis through an angle up to 45° will impart rolling movement to said cylinders along confining sides of both of said members while increasingly compressing said cylinders radially therebetween throughout rotation of said members through said angle, the radius of said cylinders being at least ¼ the length of the straight sides of said inner members, and the length of the straight sides of the inner member being approximately ⅔ the spacing between opposite inner sides of the outer member.

6. A flexible joint according to claim 1, including means projecting inwardly from the sides of said outer member to prevent relative rotation of said inner and outer members in one direction from a no-load condition.

7. A flexible joint according to claim 1, including means projecting inwardly from the sides of said outer member to prevent relative rotation of said inner and outer members in one direction from a no-load condition, and to limit relative rotation in the opposite direction through an angle closely approaching but less than 90°.

8. In a flexible coupling comprising an outer tubular member, a pair of inner members coaxially mounted within the outer member for rotation relative thereto and relative to each other about their common axis, and a plurality of sets of cylinders of elastic cushioning material, the cylinders of said sets being disposed between the interior of the outer member and the exterior of the inner members respectively, said cylinders being generally circular in transverse section when unstressed and being disposed with their axes parallel to said common axis, the improvement in which the interior of said outer member and the exteriors of said inner members substantially correspond in transverse section to straight sided squares, the straight sides of the inner members normally being disposed opposite the apices of the outer member and intersecting at corners spaced from the straight sides of the outer member with clearance, the straight inner sides of the outer member merging at their corner junctions along inwardly concave curves, and each of said cylinders being normally disposed against one of said curved junctions and confined between two adjacent straight sides of the outer member and one straight side of one of the inner members, whereby relative rotation of said inner members in opposite directions through an angle up to 90° will impart rolling movement to said cylinders along confining sides of said inner and outer members while increasingly compressing said cylinders radially therebetween throughout relative rotation of said inner members through said angle.

References Cited in the file of this patent

UNITED STATES PATENTS

| | | |
|---|---|---|
| 331,497 | Hardie | Dec. 1, 1885 |
| 1,425,616 | Tarbox | Aug. 15, 1922 |
| 1,515,716 | Adams | Nov. 18, 1924 |
| 1,590,055 | Porter | June 22, 1926 |
| 1,951,013 | Flintermann | May 13, 1934 |
| 2,084,761 | Bradley | June 22, 1937 |
| 2,388,450 | Thompson | Nov. 6, 1945 |
| 2,474,921 | Tarpley | July 5, 1949 |

FOREIGN PATENTS

| | | |
|---|---|---|
| 621,443 | France | Feb. 5, 1927 |
| 778,691 | France | Jan. 2, 1935 |